US011922867B1

(12) United States Patent
Holsteen et al.

(10) Patent No.: US 11,922,867 B1
(45) Date of Patent: Mar. 5, 2024

(54) MOTION CORRECTED INTERLEAVING

(71) Applicant: Apple Inc., Cupertino, CA (US)

(72) Inventors: Aaron L. Holsteen, Aurora, CO (US); Kaikai Guo, San Francisco, CA (US); Xiaokai Li, Mountain View, CA (US); Zhibing Ge, Los Altos, CA (US); Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 17/511,369

(22) Filed: Oct. 26, 2021

Related U.S. Application Data

(60) Provisional application No. 63/130,013, filed on Dec. 23, 2020.

(51) Int. Cl.
*G09G 3/3208* (2016.01)

(52) U.S. Cl.
CPC ....... *G09G 3/3208* (2013.01); *G09G 2310/08* (2013.01); *G09G 2320/0261* (2013.01); *G09G 2320/106* (2013.01)

(58) Field of Classification Search
CPC ............ G09G 3/3208; G09G 2310/08; G09G 2320/0261; G09G 2320/106
See application file for complete search history.

(56) References Cited

U.S. PATENT DOCUMENTS

| | | | | |
|---|---|---|---|---|
| 8,059,174 | B2 | 11/2011 | Mann et al. | |
| 8,913,153 | B2 | 12/2014 | Li et al. | |
| 9,894,304 | B1 | 2/2018 | Smith et al. | |
| 2021/0383774 | A1* | 12/2021 | Tokuchi | G06F 3/0488 |

OTHER PUBLICATIONS

Goettker et al., "Differences between oculomotor and perceptual artifacts for temporally limited head mounted displays," Journal of the Society for Information Display, vol. 28, Issue 6, Jun. 2, 2020, 23 pages.

Burnes, A., "NVIDIA DLSS 2.0: A Big Leap in AI Rendering," NVIDIA, Mar. 23, 2020, 10 pages.

* cited by examiner

*Primary Examiner* — Jonathan A Boyd
(74) *Attorney, Agent, or Firm* — Fletcher Yoder, P.C.

(57) ABSTRACT

In an embodiment, an electronic device includes a display and processing circuitry. The display includes a plurality of pixels arranged in a plurality of rows, wherein a first grouping of the plurality of rows displays image content during a first portion of an image frame, and wherein a second grouping of the plurality of rows displays image content during a second portion of the image frame. The processing circuitry is operatively coupled to the display and determines a velocity associated with the image content displayed by the first grouping of the plurality of rows moving across the display and adjusts a position of the image content displayed by the second grouping of the plurality of rows during the second portion of the image frame.

20 Claims, 13 Drawing Sheets

MOTION CORRECTED INTERLEAVING

CROSS-REFERENCE TO RELATED APPLICATIONS

This application is a non-provisional application claiming priority to U.S. Provisional Application No. 63/130,013, entitled "Motion Corrected Interleaving,"filed Dec. 23, 2020, which is hereby incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to motion corrected interleaving techniques that can be used to reduce strobing artifacts on electronic displays while maintaining motion clarity. Electronic displays display still image frames sequentially at a defined frame rate in order to render content to a user of the electronic display. The electronic display samples the content at a specific time interval such that the frames appear to be continuous objects rather than discretely sampled objects. Blurring occurs when pixels in an electronic display transition between subsequent frames slow enough for a user to perceive multiple frames at the same time. Strobing occurs when the electronic display produces spatially distinct frames of rendered content instead of a smooth movement of the content. Blurring and strobing can reduce motion clarity and adversely affect a user's viewing experience of an electronic display. Interleaving refers to a technique where pixels rows are progressively skipped for one image frame and then updated for a subsequent image frame.

BRIEF DESCRIPTION OF THE DRAWINGS

Various aspects of this disclosure may be better understood upon reading the following detailed description and upon reference to the drawings described below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
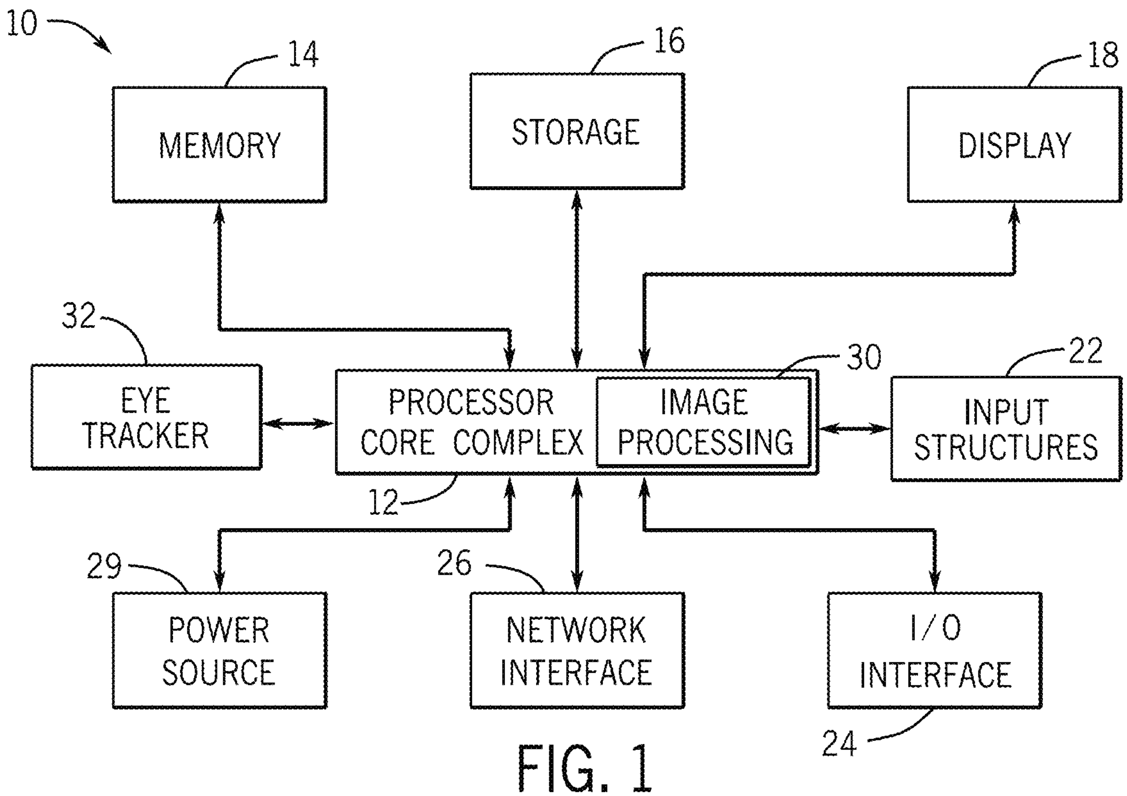
FIG. 1 is a block diagram of an electronic device with an electronic display, according to an embodiment.
Figure 2:
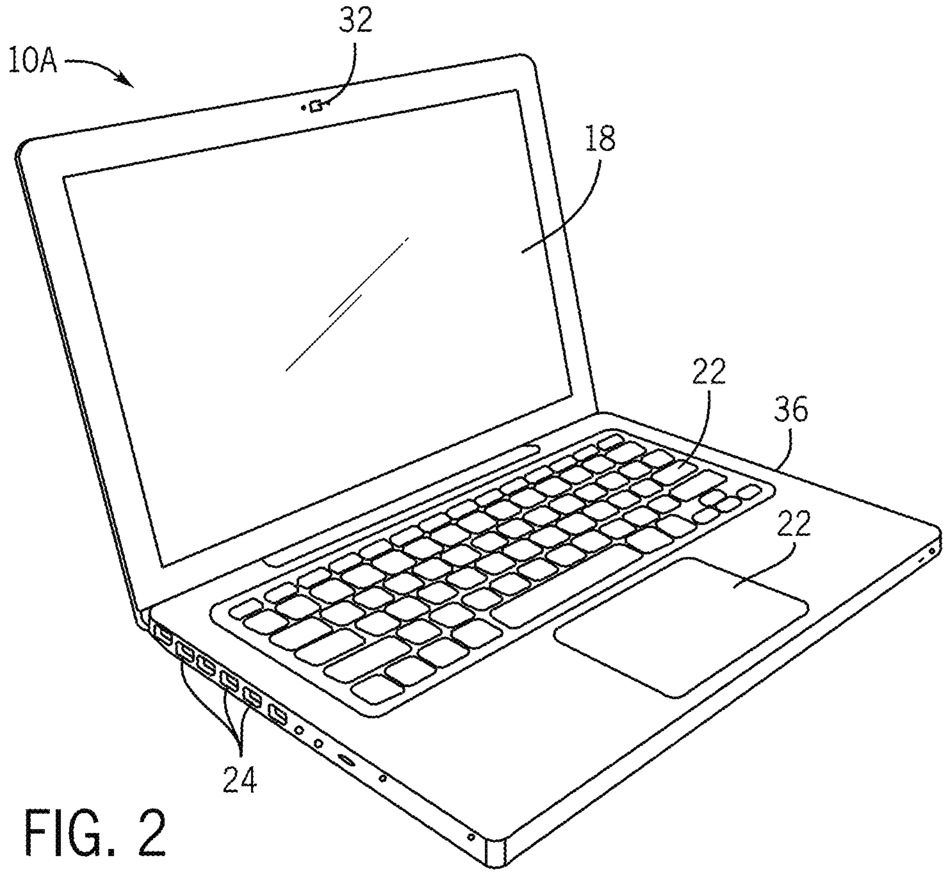
FIG. 2 is a perspective view of a notebook computer representing an embodiment of the electronic device of FIG. 1.
Figure 4:
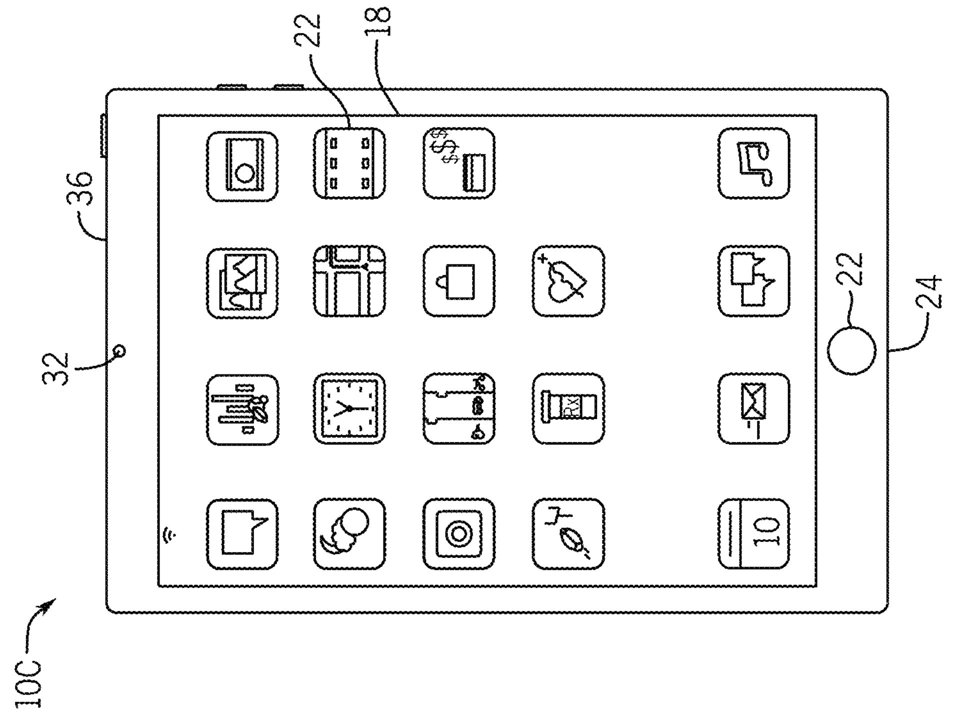
FIG. 4 is a front view of another hand-held device representing another embodiment of the electronic device of FIG. 1.
Figure 3:
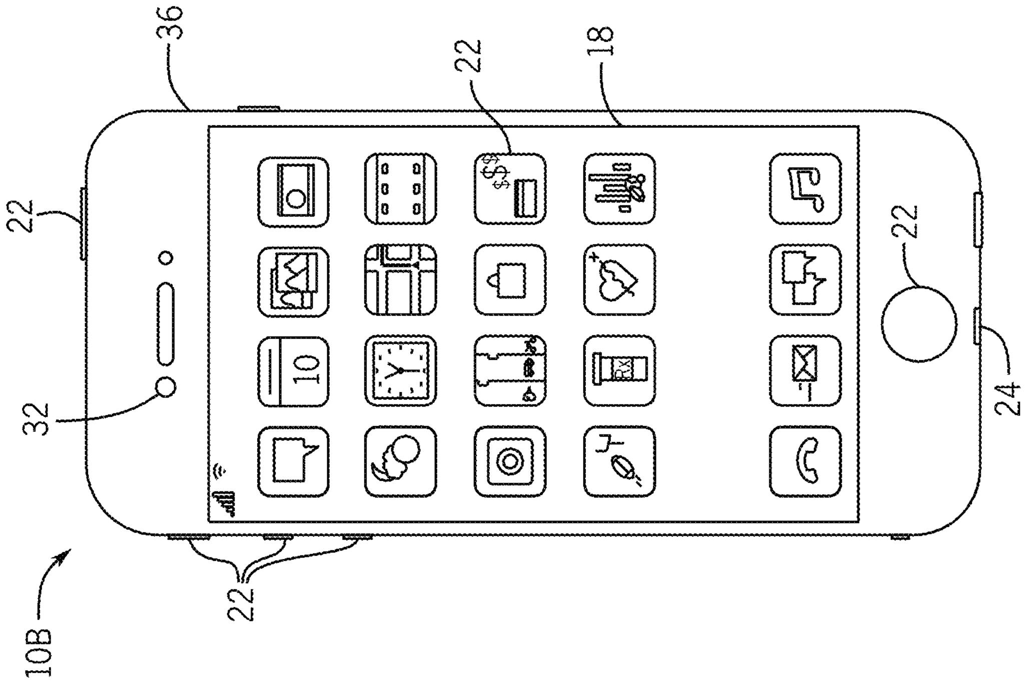
FIG. 3 is a front view of a hand-held device representing another embodiment of the electronic device of FIG. 1.
Figure 5:
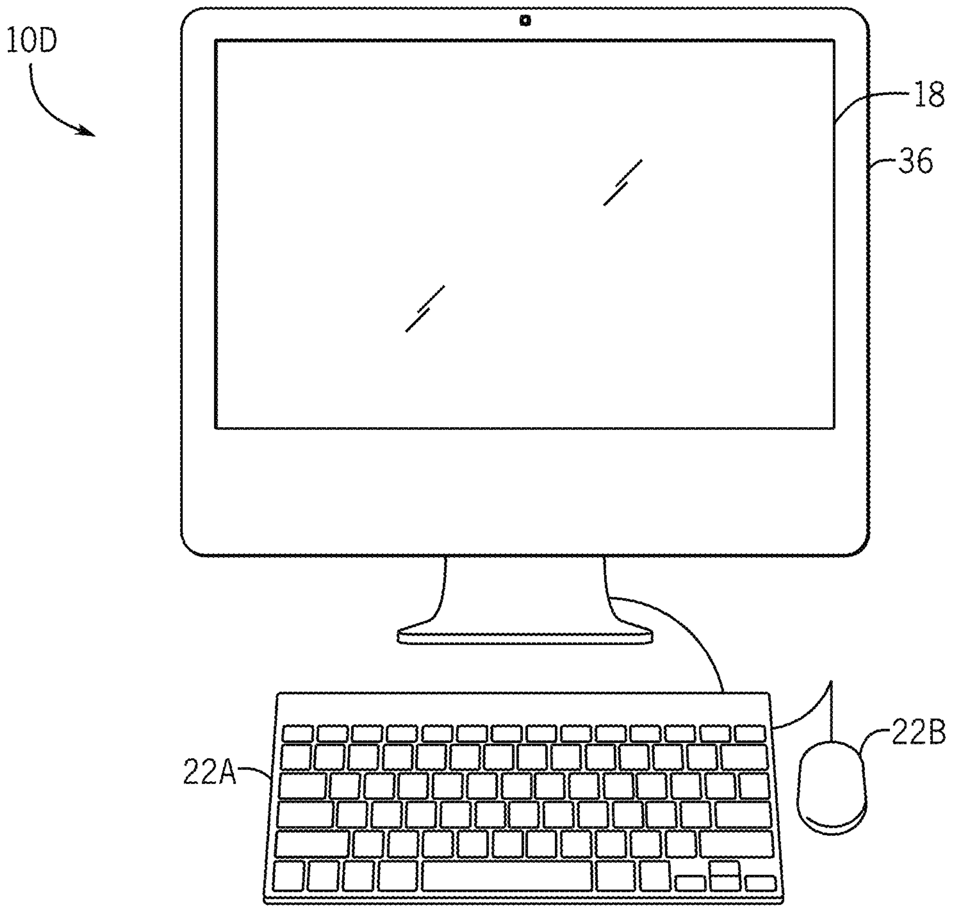
FIG. 5 is a front view of a desktop computer representing another embodiment of the electronic device of FIG. 1.
Figure 6:
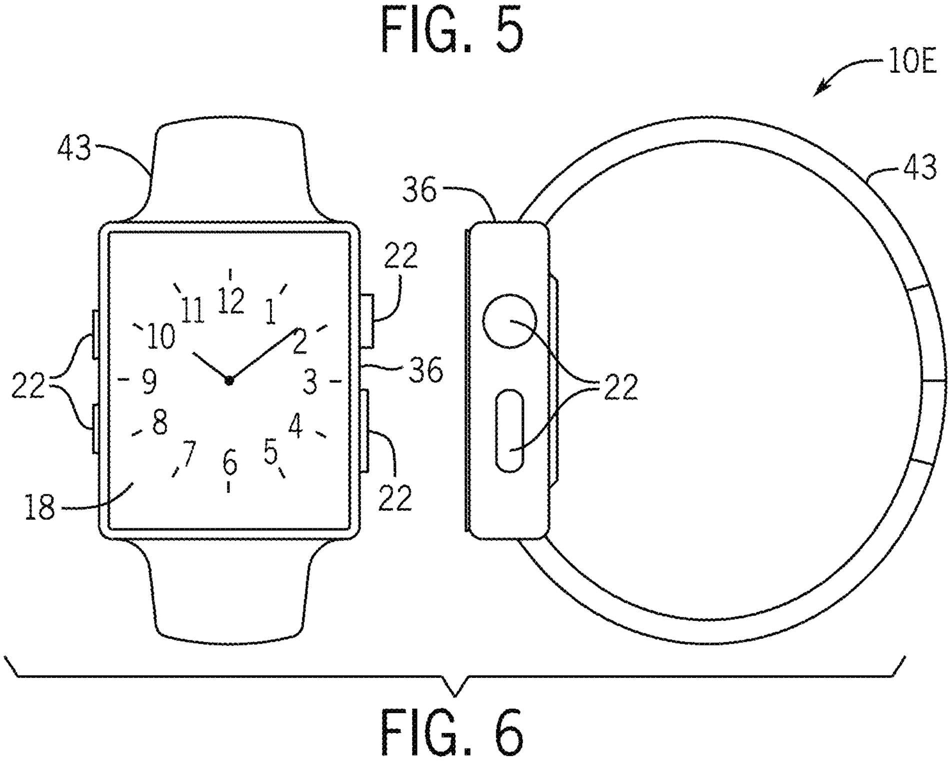
FIG. 6 is a perspective view of a wearable electronic device representing another embodiment of the electronic device of FIG. 1.

FIG. 1 illustrates a block diagram of an electronic device 10 that may provide motion corrected interleaving techniques for an electronic display. As described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or any suitable similar device with a display.

The electronic device 10 shown in FIG. 1 may include, for example, a processor core complex 12, a memory 14, a storage device 16, an electronic display 18, input structures 22, an input/output (I/O) interface 24, a network interface 26, a power source 29, and an eye tracker 32. The electronic device 10 may include image processing circuitry 30. The image processing circuitry 30 may prepare image data (e.g., pixel data) from the processor core complex 12 for display on the electronic display 18.

Although the image processing circuitry 30 is shown as a component within the processor core complex 12, the image processing circuitry 30 may represent any suitable hardware and/or software that may occur between the initial creation of the image data and its preparation for display on the electronic display 18. Thus, the image processing circuitry 30 may be located wholly or partly in the processor core complex 12, wholly or partly as a separate component between the processor core complex 12 and the electronic display 18, or wholly or partly as a component of the electronic display 18.

The various components of the electronic device 10 may include hardware elements (including circuitry), software elements (including machine-executable instructions stored on a tangible, non-transitory medium, such as the local memory 14 or the storage device 16, or a combination of both hardware and software elements. It should be noted that FIG. 1 is merely one example of a particular implementation and is intended to illustrate the types of components that may be present in the electronic device 10. Indeed, the various components illustrated in FIG. 1 may be combined into fewer components or separated into additional components. For instance, the local memory 14 and the storage device 16 may be included in a single component.

The processor core complex 12 may perform a variety of operations of the electronic device 10, such as generating image data to be displayed on the electronic display 18 and performing motion corrected interleaving of the content to be displayed on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application) stored on a suitable storage apparatus, such as the local memory 14 and/or the storage device 16.

The memory 14 and the storage device 16 may also store data to be processed by the processor core complex 12. That is, the memory 14 and/or the storage device 16 may include random access memory (RAM), read only memory (ROM), rewritable non-volatile memory such as flash memory, hard drives, optical discs, or the like.

The electronic display 18 may be a self-emissive display, such as an organic light emitting diode (OLED) display, an LED display, or μLED display, or may be a liquid crystal display (LCD) illuminated by a backlight. In some embodiments, the electronic display 18 may include a touch screen, which may allow users to interact with a user interface of the electronic device 10. Additionally, the electronic display 18 may show motion corrected interleaved content.

The electronic display 18 may display various types of content. For example, the content may include a graphical user interface (GUI) for an operating system or an application interface, still images, video, or any combination thereof. The processor core complex 12 may supply or modify at least some of the content to be displayed.

The input structures 22 of the electronic device 10 may enable a user to interact with the electronic device 10 (e.g., pressing a button or icon to increase or decrease a volume level). The I/O interface 24 and the network interface 26 may enable the electronic device 10 to interface with various other electronic devices. The power source 29 may include any suitable source of power, such as a rechargeable lithium polymer (Li-poly) battery and/or an alternating current (AC) power converter.

The network interface 26 may include, for example, interfaces for a personal area network (PAN), such as a Bluetooth network, a local area network (LAN) or wireless local area network (WLAN), such as an 802.11x Wi-Fi network, and/or a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth.

The eye tracker 32 may measure positions and movement of one or both eyes of a person viewing the electronic display 18 of the electronic device 10. For instance, the eye tracker 32 may be a camera that records the movement of a viewer's eye(s) as the viewer looks at the electronic display 18. However, several different practices may be employed to track a viewer's eye movements. For example, different types of infrared/near infrared eye tracking techniques such as bright-pupil tracking and dark-pupil tracking may be used. In these types of eye tracking, infrared or near infrared light is reflected off of one or both of the eyes of the viewer to create corneal reflections.

A vector between the center of the pupil of the eye and the corneal reflections may be used to determine a point on the electronic display 18 at which the viewer is looking. Moreover, as discussed below, varying portions of the electronic display 18 may be used to show content in relatively higher and lower luminance level portions based at least in part on the point of the electronic display 18 at which the viewer is looking.

As discussed above, the electronic device 10 may be a computer, a portable electronic device, a wearable electronic device, or other type of electronic device. Example computers may include generally portable computers (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro®available from Apple Inc. of Cupertino, California.

By way of example, the electronic device 10 depicted in FIG. 2 is a notebook computer 10A, in accordance with one embodiment of the present disclosure. The computer 10A includes a housing or enclosure 36, an electronic display 18, input structures 22, and ports of an I/O interface, such as the I/O interface 24 discussed with respect to FIG. 1. In one embodiment, a user of the computer 10A may use the input structures 22 (such as a keyboard and/or touchpad) to interact with the computer 10A, such as to start, control, or operate a GUI or applications running on the computer 10A. For example, a keyboard and/or touchpad may allow the user to navigate a user interface or application interface displayed on the electronic display 18. Additionally, the computer 10A may include an eye tracker 32, such as a camera.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. The handheld device 10B includes an enclosure 36 to protect interior components from physical damage and to shield the interior components from electromagnetic interference. The enclosure 36 may surround the electronic display 18. The I/O interfaces 24 may be formed through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol. Moreover, the handheld device 10B may include an eye tracker 32.

The user input structures 22, in combination with the electronic display 18, may allow a user to control the handheld device 10B. For example, the input structures 22 may activate or deactivate the handheld device 10B, navigate a user interface to a home screen or a user-configurable application screen, and/or activate a voice-recognition feature of the handheld device 10B. Other input structures 22 may provide volume control, or toggle between vibrate and ring modes. The input structures 22 may also include a microphone to obtain a voice of the user for various voice-related features, and a speaker to enable audio playback and/or certain capabilities of the handheld device 10B. The input structures 22 may also include a headphone input to provide a connection to external speakers and/or headphones.

FIG. 4 depicts a front view of another handheld device 10C, which represents another embodiment of the electronic device 10 discussed with respect to FIG. 1. The handheld device 10C may represent, for example, a tablet computer or portable computing device. By way of example, the handheld device 10C may be a tablet-sized embodiment of the electronic device 10, which may be, for example, a model of an iPad® available from Apple Inc. The various components of the handheld device 10C may be similar to the components of the handheld device 10B discussed with respect to the FIG. 3. The handheld device 10C may include an eye tracker 32.

FIG. 5 depicts a computer 10D which represents another embodiment of the electronic device 10 discussed with respect to FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. The enclosure 36 of the computer 10D may be provided to protect and enclose internal components of the computer 10D, such as the electronic display 18. In certain embodiments, a user of the computer 10D may interact with the computer 10D using various peripheral input devices, such as input structures 22A and 22B (e.g., keyboard and mouse), which may connect to the computer 10D. Furthermore, the computer 10D may include an eye tracker 32.

FIG. 6 depicts a wearable electronic device 10E representing another embodiment of the electronic device 10 discussed with respect to FIG. 1. The wearable electronic device 10E is configured to operate using techniques described herein. By way of example, the wearable electronic device 10E may be virtual reality glasses. Additionally or alternatively, the wearable electronic device 10E may be or include other wearable electronic devices such as augmented reality glasses.

The electronic display 18 of the wearable electronic device 10E may be visible to a user when the electronic device 10E is worn by the user. Additionally, while the user is wearing the wearable electronic device 10E, an eye tracker (not shown) of the wearable electronic device 10E may track the movement of one or both of the eyes of the user. In some instances, the handheld device 10B discussed with respect to FIG. 3 may be used in the wearable electronic device 10E. For example, a portion 37 of a headset 38 of the wearable electronic device 10E may allow a user to secure the handheld device 10B therein and use the handheld device 10B to view virtual reality content.

Figure 7:
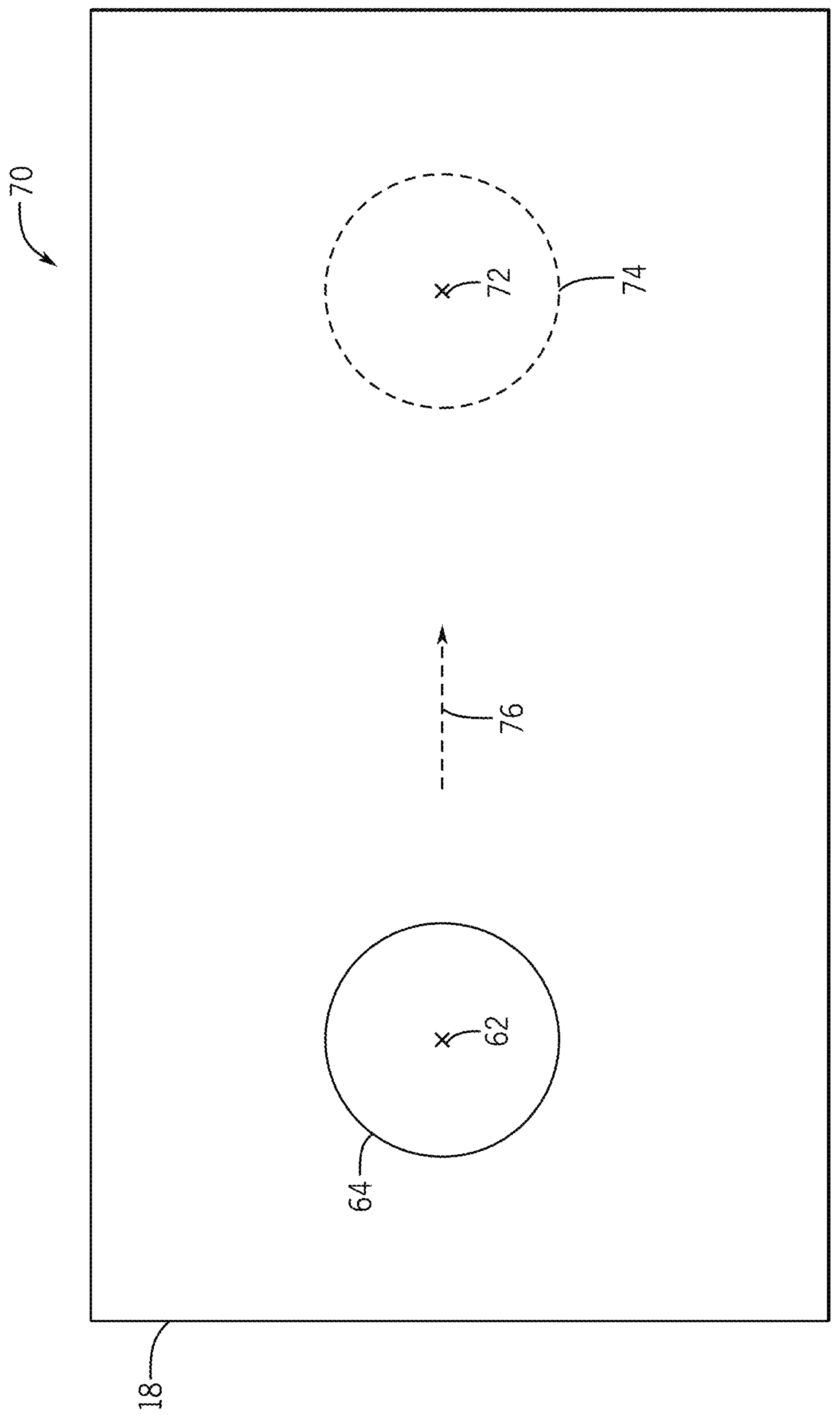
FIG. 7 is a diagram of the display of FIG. 1 showing multiple image frames, according to an embodiment of the electronic device of FIG. 1.

FIG. 7 is a diagram 70 representative of the electronic display 18 displaying content moving across the electronic display 18. The diagram 70 includes a first frame 64 and a third frame 74. The first frame 64 and the third frame 74 each may represent a different portion of a single content frame (e.g., a different portion of a single image) or each may represent a different content frame of consecutive content frames (e.g., content frames of a video). In some instances, transitional frames between these frames provide a smooth movement of the frames 64 and 74 from a first location 62 associated with the first frame 64 and a second location 72 associated with the third frame 74. During a transition from the first frame 64 to the third frame 74 the image content rendered on the electronic display is moved from a left side of the electronic display 18 to a right side of the electronic display 18 in the direction of arrow 76.

Figure 8:
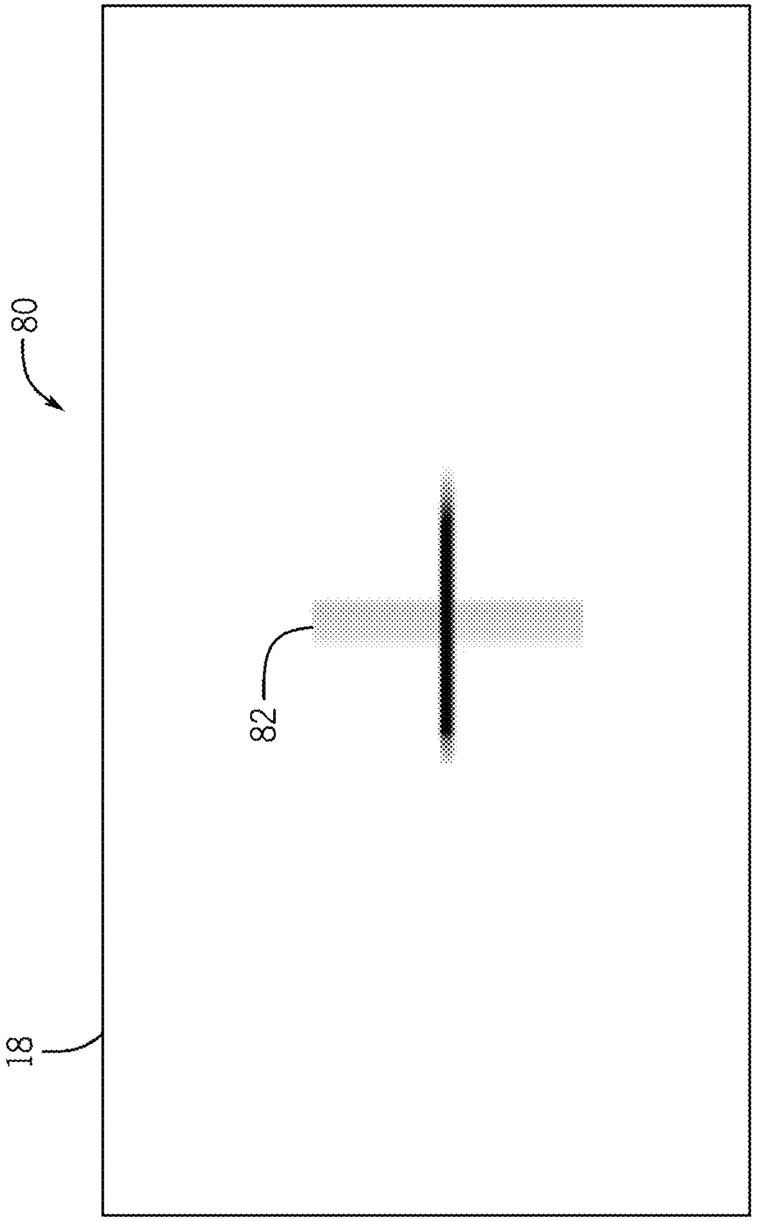
FIG. 8 is a diagram of the display of FIG. 1 showing a blurring effect, according to an embodiment of the electronic device of FIG. 1.

FIG. 8 is a diagram 80 representative of the electronic display 18 displaying a blurring artifact from content moving across the electronic display 18. The diagram 80 includes any number of image frames 82 that are perceived by a user due to persistence of image frames, reducing motion clarity for the electronic display 18 and adversely effecting a user experience.

Figure 9:
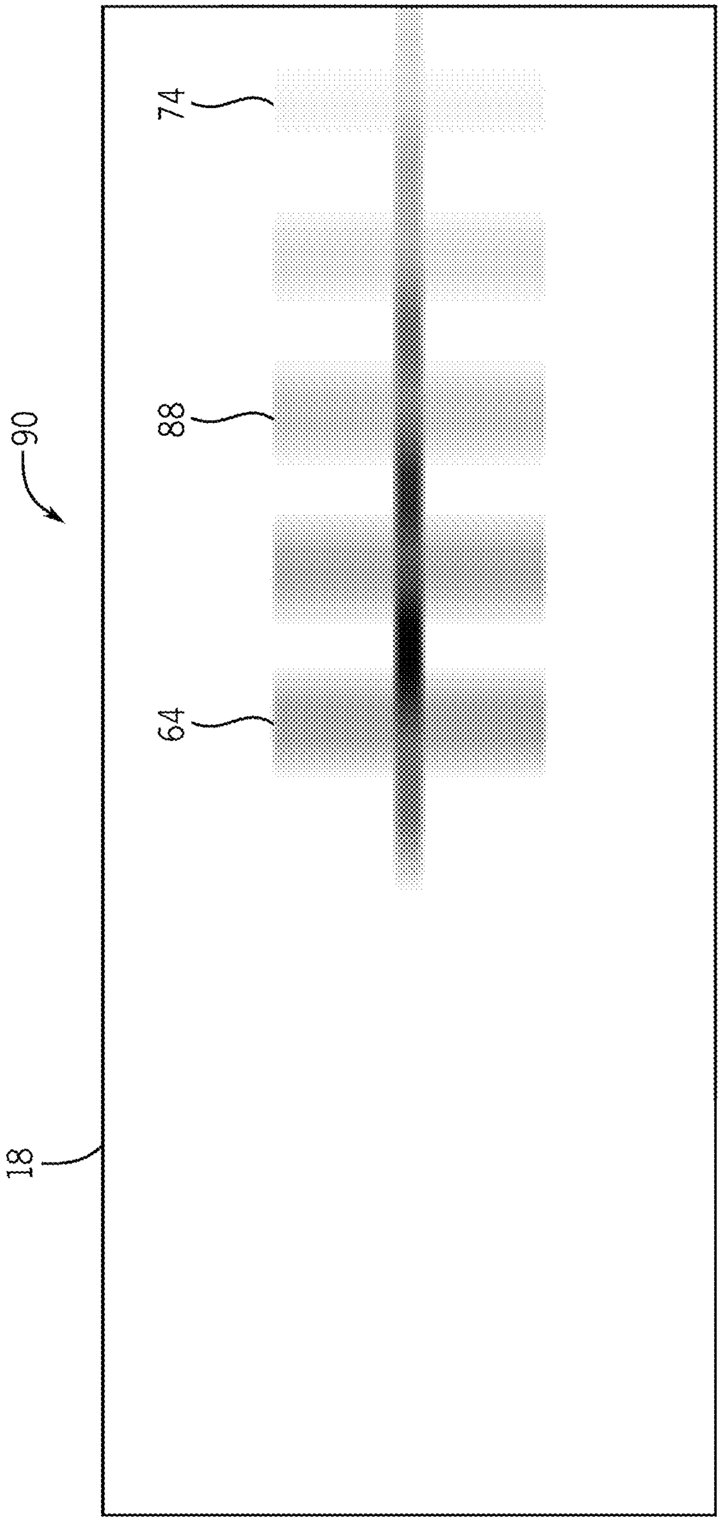
FIG. 9 is a diagram of the display of FIG. 1 showing a strobing effect, according to an embodiment of the electronic device of FIG. 1.

FIG. 9 is a diagram 90 representative of the electronic display 18 displaying a strobing artifact from content moving across the electronic display 18. The diagram 90 includes first frame 64, second frame 88, and any number of intermediate frames between the first frame 64 and the second frame 88, such as third frame 74. As shown, the strobing artifact displays multiple, clearly separated image frames instead of a smooth movement of the rendered content on the electronic display 18.

Figure 10:
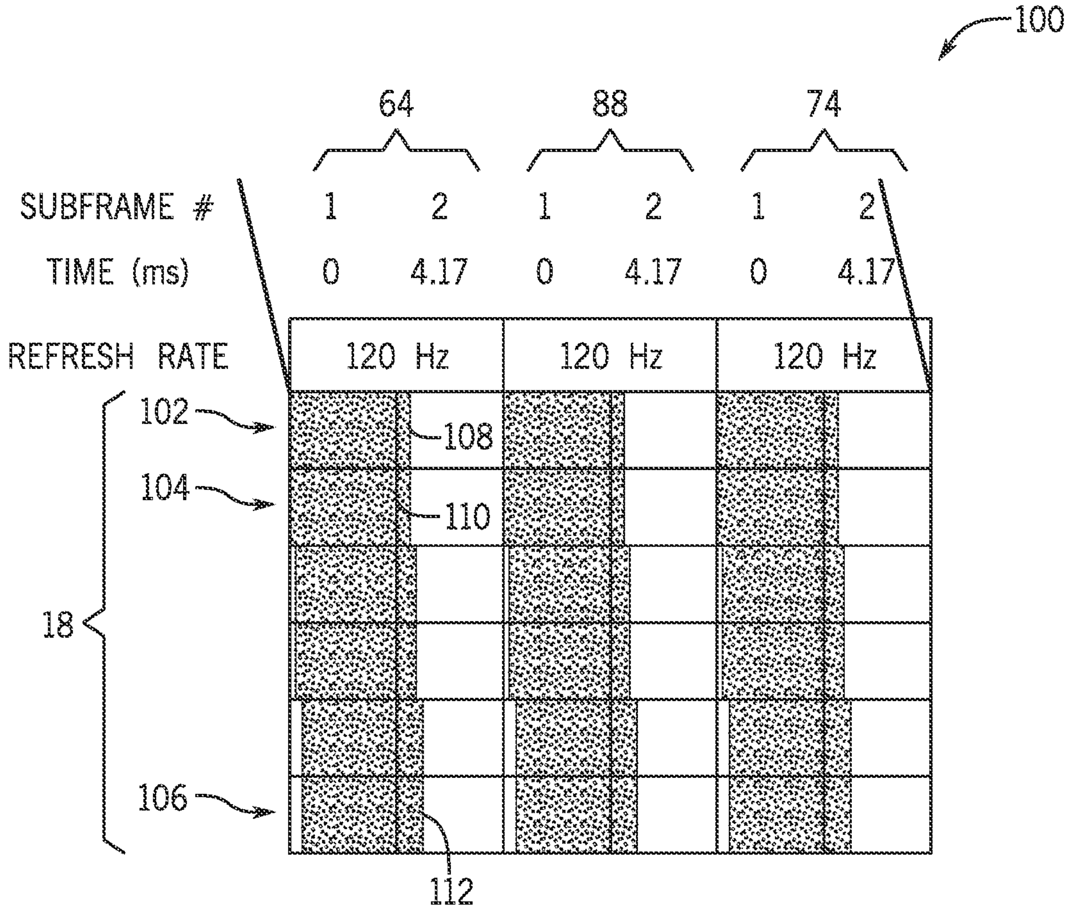
FIG. 10 is a timing diagram of the display of FIG. 1 including non-interleaved pixel rows, according to an embodiment of the electronic device of FIG. 1.

FIG. 10 is a timing diagram 100 that illustrates non-interleaved techniques for pixel rows of an electronic display, such as electronic display 18. The electronic display 18 may include a display panel having multiple display pixels arranged as an array or matrix defining multiple rows and columns. For example, the electronic display 18 includes first pixel row 102, second pixel row 104, and sixth pixel row 106. The timing diagram 100 includes emission periods for first frame 64, second frame 88, and third frame 74. As shown in timing diagram 100, the first pixel row 102 emits light during a first portion 108 (e.g., a first subframe) of the first frame 64, a first portion of the second frame 88, and a first portion of the third frame 74. The second pixel row 104 emits light during a second portion 110 of the first frame 64 and the sixth pixel row 106 emits light during a further delayed portion 112 of the first frame 64. In some embodiments, the first portion 108 and the second portion 110 may be the same. In certain embodiments, the electronic display 18 may have a low duty cycle (e.g., fifty percent or less) such that each row of pixels emits light during only a portion of an image frame.

Figure 11:
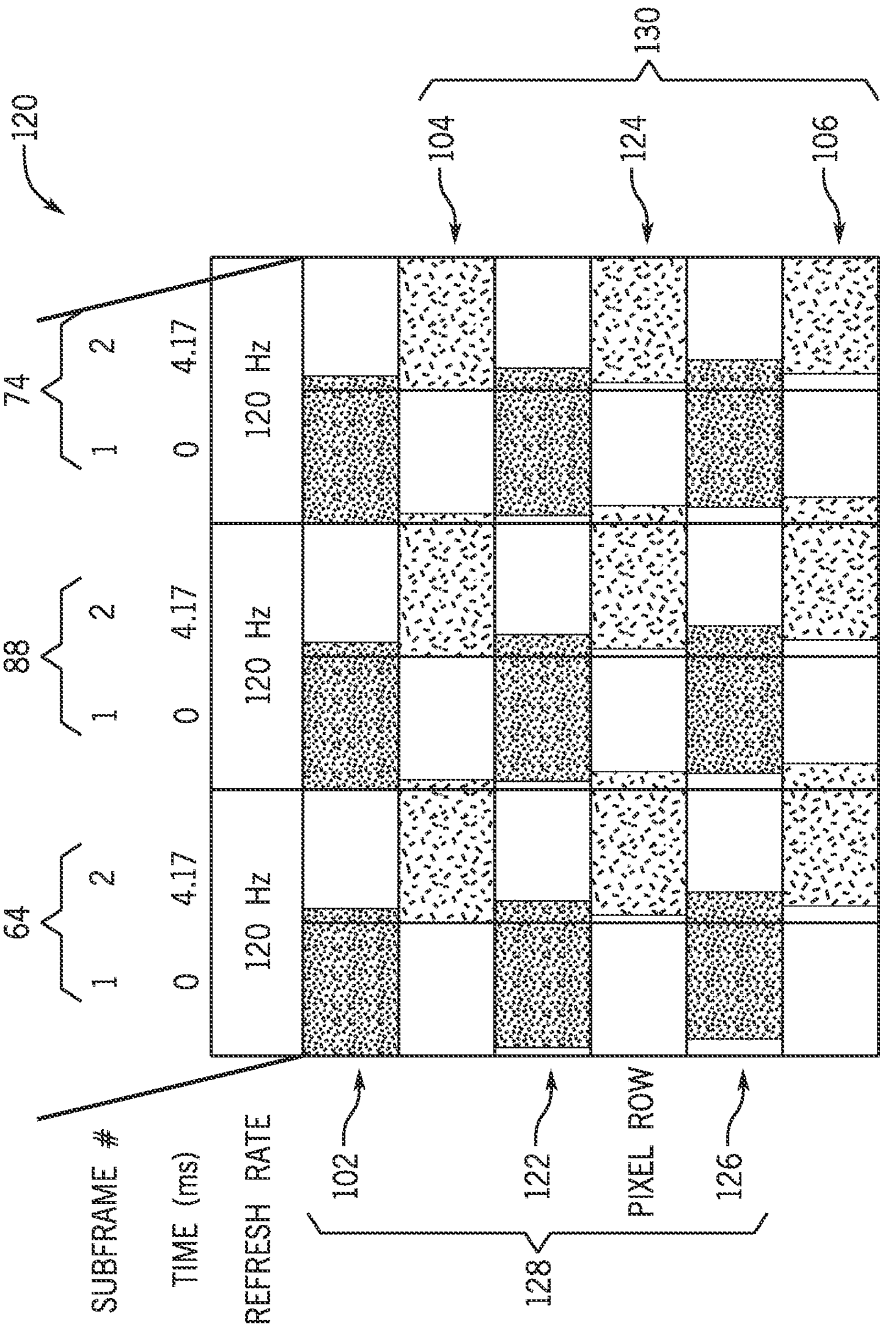
FIG. 11 is a timing diagram of the display of FIG. 1 including two pixel row interleaved timing, according to an embodiment of the electronic device of FIG. 1.

FIG. 11 is a timing diagram 120 that illustrates interleaved techniques for two pixel rows of an electronic display, such as electronic display 18. The timing diagram 120 includes emission periods for first frame 64, second frame 88, and third frame 74. Each of the frames are divided into two subframes. While the timing diagram 120 only illustrates two subframes, any number of subframes may be used (e.g., three, four, and so forth). Pixel rows of the electronic display may be grouped according to odd and even numbered rows (or into groups comprised of equal values of pixel row modulo n subframes). For example, the first pixel row 102, third pixel row 122, and fifth pixel row 126 may be grouped into a first pixel row group 128. The second pixel row 104, the fourth pixel row 124, and the sixth pixel row 106 may be grouped into a second pixel row group 130. As shown in timing diagram 120, each pixel row of the first pixel row group 128 emits light during a first portion (e.g., first subframe) of the first frame 64, a first portion of the second frame 88, and a first portion of the third frame 74. Each pixel row of the second pixel row group 130 emits light during a second portion (e.g., second subframe) of the first frame 64, a second portion of the second frame 88, and a second portion of the third frame 74. As such, pixel rows in the second pixel row group 130 are skipped during a first portion of the image frames and then updated with image content during the second portion of the image frames. In some embodiments, the emission portions of the first pixel row group 128 may overlap with emission portions of the second pixel row group 130.

Figure 12:
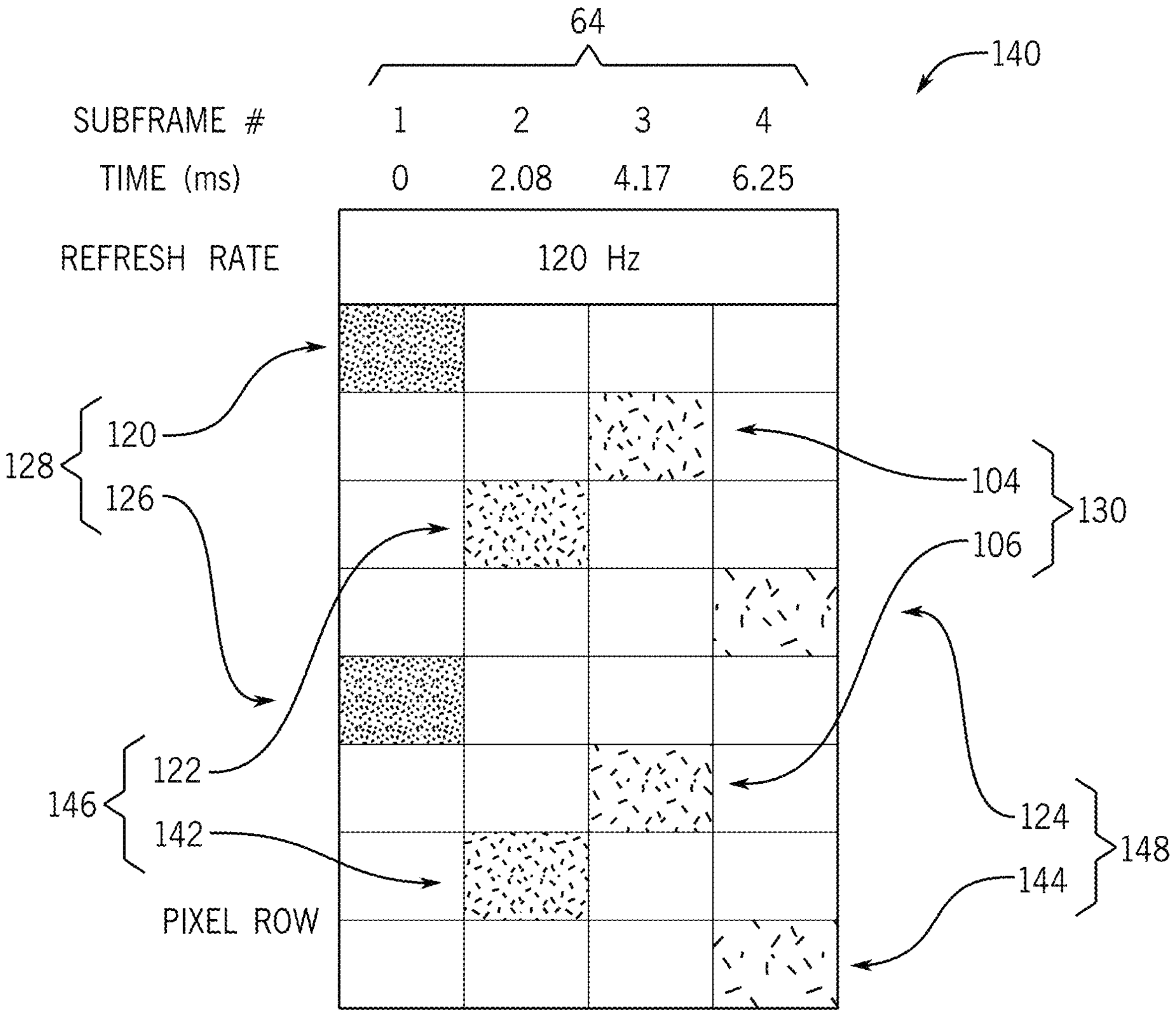
FIG. 12 is a timing diagram of the display of FIG. 1 including four pixel row interleaved timing, according to an embodiment of the electronic device of FIG. 1.

FIG. 12 is a timing diagram 140 that illustrates interleaved techniques for four pixel rows of an electronic display, such as electronic display 18. The timing diagram 140 includes emission periods for first frame 64 and first frame 64 is divided into four subframes. While the timing diagram 140 only illustrates one frame, any number of frames may be used with the interleaving technique. While the timing diagram 140 only illustrates four subframes, any number of subframes may be used (e.g., six, eight, and so forth). Pixel rows of the electronic display may be grouped according into four separate groups. For example, the first pixel row 102 and the fifth pixel row 126 may be grouped into the first pixel row group 128. The second pixel row 104 and the sixth pixel row 106 may be grouped into the second pixel row group 130. The third pixel row 122 and a seventh pixel row 142 may be grouped into a third pixel row group 146 and the fourth pixel row 124 and an eighth pixel row 144 may be grouped into a fourth pixel row group 148. As shown in timing diagram 140, each pixel row of the first pixel row group 128 emits light during a first portion (e.g., first subframe) of the first frame 64. Each pixel row of the third pixel row group 146 is skipped during the first portion of the first frame 64 emits light during a second portion (e.g., second subframe) of the first frame 64. Each pixel row of the second pixel row group 130 is skipped during the first portion and the second portion of the first frame 64 and emits light during a third portion (e.g., third subframe) of the first frame 64. Each pixel row of the fourth pixel row group 148 is skipped during the first, second, and third portions of the first frame 64 and emits light during a fourth portion (e.g., fourth subframe) of the first frame 64. As such, pixel rows may be skipped during three portions of the image frame and emit light during a remaining portion of the image frame. In some embodiments, the emission portions of one pixel row group may overlap with emission portions of a sequential pixel row group and each pixel row groups may be rearranged to any presentation order (e.g., first pixel row group 128 then second pixel row group 130 then third pixel row group 146 then fourth pixel row group 148).

Figure 13:
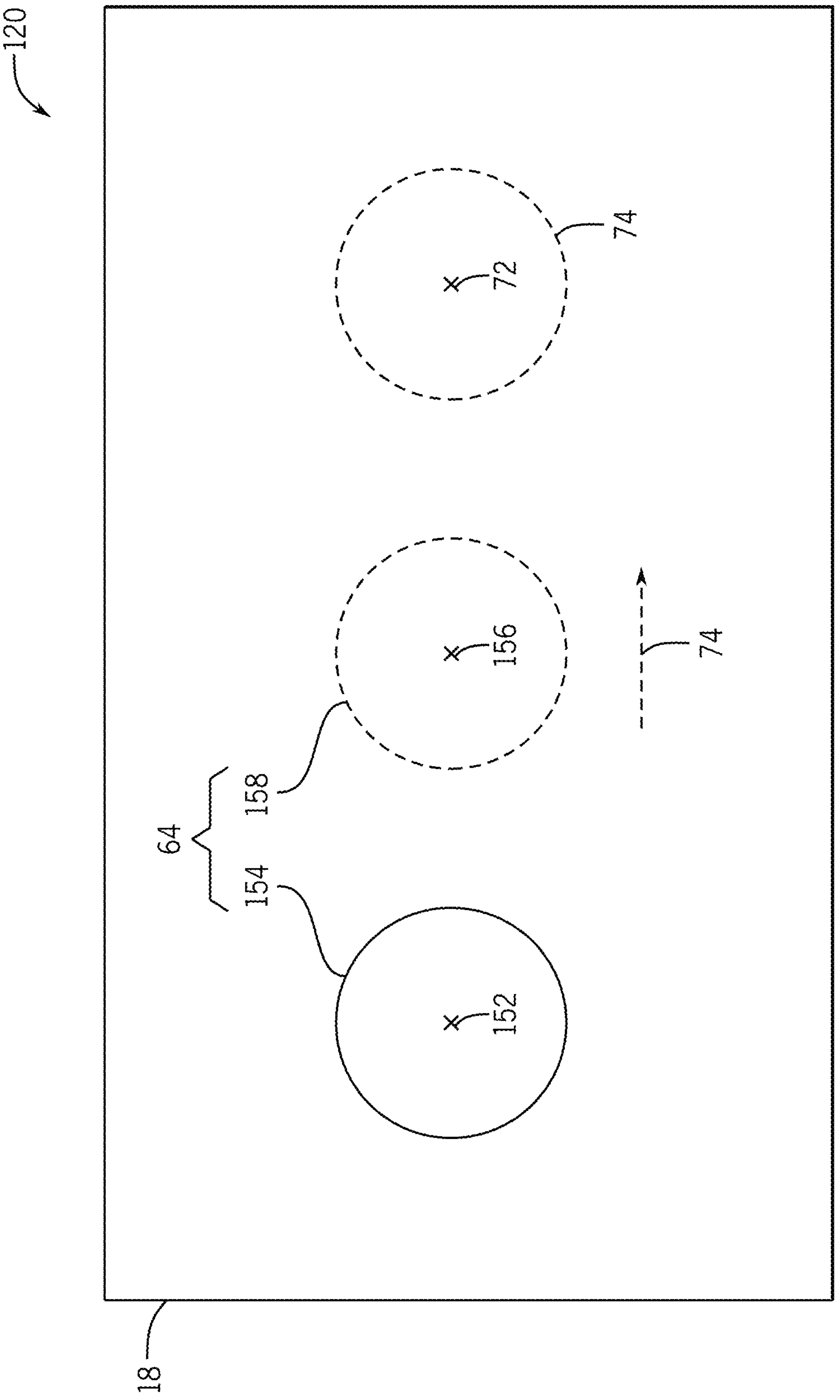
FIG. 13 is a diagram of the display of FIG. 1 displaying subframes of an image frame, according to an embodiment of the electronic device of FIG. 1.

FIG. 13 is a diagram 150 representative of the electronic display 18 displaying motion correction interleaving techniques for two pixel row interleaving in FIG. 11. The diagram 150 includes the first frame 64 and the third frame 74. The first frame 64 may include any number of subframes, such as first subframe 154 and second subframe 158. In some instances, transitional frames between these frames provide a smooth movement of the frames 64 and 74 from a first location 152 associated with the first subframe 154 and the second location 72 associated with the third frame 74. During a transition from the first frame 64 to the third frame 74 the image content rendered on the electronic display is moved from a left side of the electronic display 18 to a right side of the electronic display 18 in the direction of arrow 76. A motion corrected interleaving system may accommodate for movement of the rendered content between subframes in order to increase motion clarity and reduce adverse visual effects, such as blurring and/or strobing artifacts. As such, the second subframe 158 may render content on the electronic display 18 at an intermediate position 156. For example, the first subframe 154 may correspond to an emission period for a first group of pixel rows of the electronic display 18, such as the first pixel row group 128 in FIG. 11. The second subframe 158 may correspond to an emission period for a second group of pixel rows of the electronic display 18, such as the second pixel row group 130 in FIG. 11.

Figure 14:
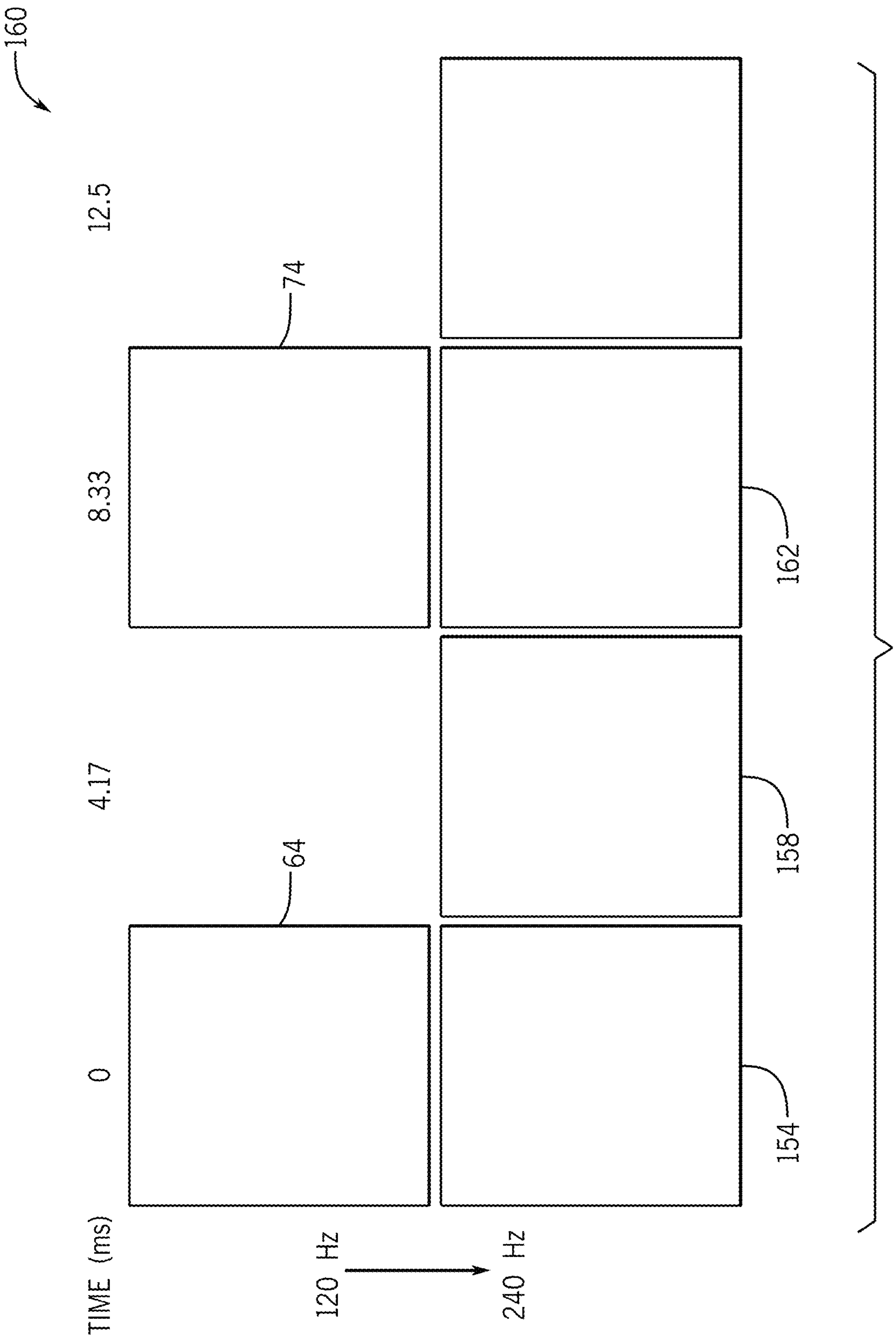
FIG. 14 is a timing diagram of the display of FIG. 1 having an increased sampling rate, according to an embodiment of the electronic device of FIG. 1.

Motion correction for the pixel row groups may be performed in any number for ways. FIG. 14 is a timing diagram 160 that illustrates increased sampling rates for a motion corrected interleaving techniques for an electronic display, such as electronic display 18. The motion corrected interleaving system may increase the sampling rate based on the number of interleaved pixel row groups. As discussed above, the first subframe 154 may be displayed by a first pixel row group, such as first pixel row group 128 in FIG. 11, and the second subframe 158 may be displayed by a second pixel row group, such as second pixel row group 130 in FIG. 11. For example, the timing diagram 160 displays a first sampling rate at 120 Hz for first frame 64 and third frame 74. By interleaving even and odd rows as discussed in FIG. 11, the sampling rate is doubled to 240 Hz. As such, the second subframe 158 of the first frame 64 may be rendered in an intermediate position between the first subframe 154 and a first subframe 162 of the third frame 74. While only a two row interleaving technique is discussed, the increased sampling rate techniques may be applied to any number of pixel row interleaving techniques (e.g., three pixel row, four pixel row, and so forth).

Figure 15:
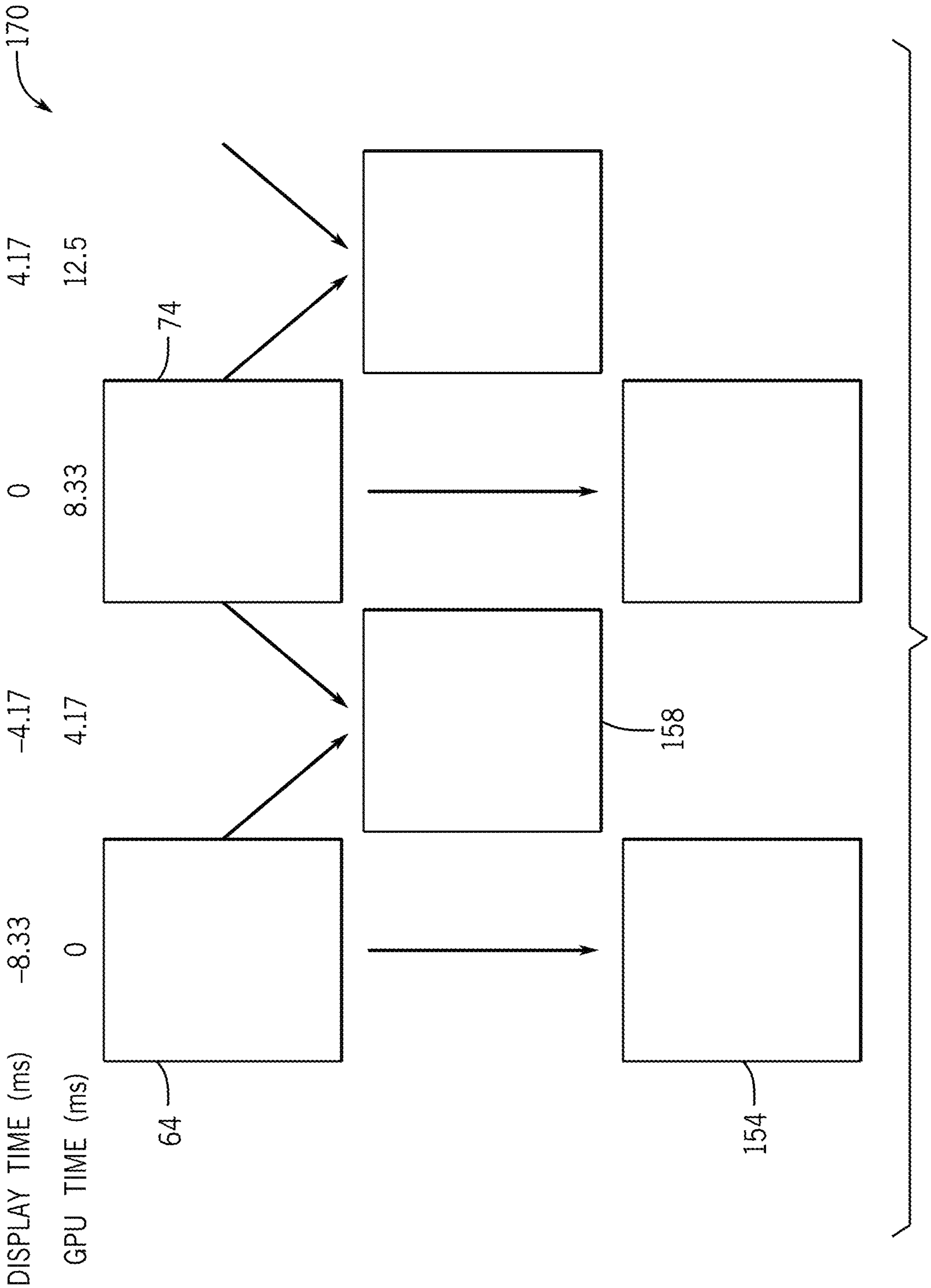
FIG. 15 is a timing diagram of the display of FIG. 1 including interpolated motion correction, according to an embodiment of the electronic device of FIG. 1.

FIG. 15 is a timing diagram 170 that illustrates interpolated motion correction techniques for an electronic display, such as electronic display 18. For example, the motion corrected interleaving system may interpolate between two previous frames and determine the content of the intermediate frame based on the interpolation. As shown in timing diagram 170, the motion corrected interleaving system may compare the first frame 64 and the third frame 74 to determine motion correction for the second subframe 158 of the first frame 64. For example, the motion corrected interleaving system may compare a first location, such as first location 62 in FIG. 7, of the rendered content in the first frame 64 with a second location, such as second location 72 in FIG. 7, of the rendered content in the third frame 74 to determine a distance which the rendered content moved across the electronic display 18. As such, the motion corrected interleaving system may determine a velocity at which the rendered content moves based on the determined distance and the time at which emission of the first frame 64 ends and the third frame 74 begins. The motion corrected interleaving system may then apply motion correction by shifting a position of the rendered content to an intermediate position, such as intermediate position 156 in FIG. 13. While only a two row interleaving technique is discussed, the interpolated motion correction techniques may be applied to any number of pixel row interleaving techniques (e.g., three pixel row, four pixel row, and so forth).

Figure 16:
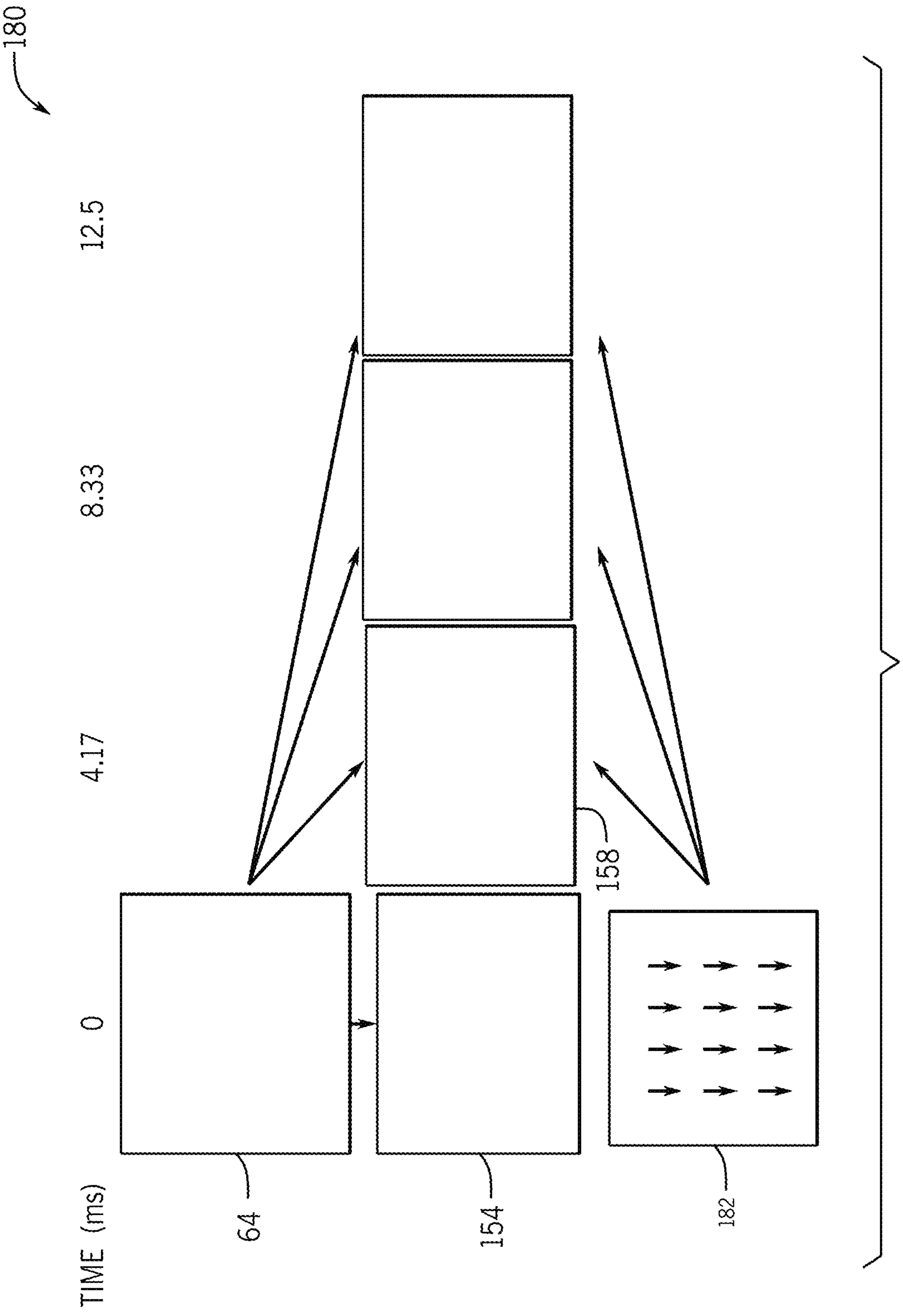
FIG. 16 is a timing diagram of the display of FIG. 1 including a velocity mapping for motion correction, according to an embodiment of the electronic device of FIG. 1.

FIG. 16 is a timing diagram 180 that illustrates frame prediction motion correction techniques for an electronic display, such as electronic display 18. For example, the motion corrected interleaving system may receive image data including a velocity mapping 182. The velocity mapping 182 (as well as an acceleration mapping) may indicate a direction of motion, a speed of motion, and/or an acceleration of motion associated with image content. For example, the first pixel row group 128 in FIG. 11 can display the content of 154, then the velocity mapping 182 may indicate image content displayed by a second pixel group, such as 130 in FIG. 11, in the second subframe 158. Note that using frame prediction, the display content is uncoupled from the display updates which allows simultaneous blur and strobing reduction even with low content frame rates (e.g., less than 90 Hz). While only a two row interleaving technique is discussed, the frame prediction motion correction techniques may be applied to any number of pixel row interleaving techniques (e.g., three pixel row, four pixel row, and so forth) and would cycle through the pixel row groups until a new content frame was delivered for presentation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

a display comprising a plurality of pixels arranged in a plurality of rows, wherein a first grouping of the plurality of rows displays image content during a first portion of an image frame, and wherein a second grouping of the plurality of rows displays image content during a second portion of the image frame;

processing circuitry operatively coupled to the display and configured to perform motion corrected interleaving of the image content at least in part by:

determining a velocity associated with the image content displayed by the first grouping of the plurality of rows and moving across the display; and adjusting a position of the image content displayed by the second grouping of the plurality of rows during the second portion of the image frame based on the velocity.

2. The electronic device of claim 1, wherein the processing circuitry is configured to:

receive image data including a velocity mapping associated with the image content, wherein the velocity mapping indicates a direction of motion and a speed of motion for the image content.

3. The electronic device of claim 1, wherein the processing circuitry is configured to receive image data including the image frame and a second image frame.

4. The electronic device of claim 1, wherein a third grouping of the plurality of rows displays image content during a third subframe portion of the image frame, wherein the first portion of the image frame is a first subframe portion of the image frame, and wherein the second portion of the image frame is a second subframe portion of the image frame.

5. The electronic device of claim 4, wherein a fourth grouping of the plurality of rows displays image content during a fourth subframe portion of the image frame.

6. The electronic device of claim 5, wherein presentation of at least a portion of the first subframe portion of the image frame temporally overlaps with presentation of at least a portion of the second subframe portion of the image frame.

7. The electronic device of claim 6, wherein presentation of at least a portion of the second subframe portion of the image frame temporally overlaps with presentation of at least a portion of the third subframe portion of the image frame.

8. The electronic device of claim 5, wherein at least a portion of the fourth subframe portion of the image frame temporally overlaps with the third subframe portion of the image frame.

9. The electronic device of claim 1, wherein the processing circuitry is configured to adjust the position of the image content displayed by the second grouping of the plurality of rows during the second portion of the image frame relative to a position of the image content displayed by the first grouping of the plurality of rows during the first portion of the image frame based on the velocity.

10. The electronic device of claim 1, wherein the first portion of the image frame corresponds to a first subframe, wherein the second portion of the image frame corresponds to a second subframe, and wherein a duration of time used to present the image frame is divided into at least a first subframe time duration and a second subframe time duration, wherein the first subframe time duration is used to present the first portion of the image frame, and wherein the second subframe time duration is used to present the second portion of the image frame.

11. A method comprising:

receiving image data associated with image content to be displayed on an electronic display during a first image frame, wherein the image data includes a velocity, an acceleration mapping, or both associated with the image content, wherein the electronic display comprises a plurality of pixels arranged in a plurality of rows, wherein a first grouping of the plurality of rows displays image content during a first portion of the first image frame, and wherein a second grouping of the plurality of rows displays image content during a second portion of the first image frame; and performing motion corrected interleaving of the image content at least in part by:

determining a position of the image content during the second portion of the first image frame; and adjusting the position of the image content based on the velocity, the acceleration mapping, or both.

12. The method of claim 11, wherein a third grouping of the plurality of rows displays image content during a third portion of the first image frame.

13. The method of claim 12, wherein a fourth grouping of the plurality of rows displays image content during a fourth portion of the first image frame.

14. The method of claim 12, comprising determining a second position of the image content during the third portion of the first image frame.

15. The method of claim 14, comprising adjusting the second position of the image content based on the velocity, the acceleration mapping, or both.

16. The method of claim 11, comprising operating the second grouping of the plurality of rows to display the image content at the adjusted position.

17. A non-transitory, computer-readable medium storing instructions that, when executed by a processor, cause the processor to:

receive image data for an electronic display, wherein the image data comprises a first image frame having image content in a first position and a second image frame having image content in a second position, and wherein the electronic display comprises a plurality of pixels arranged in a plurality of rows, wherein a first grouping of the plurality of rows displays image content during a first portion of the first image frame, and wherein a second grouping of the plurality of rows displays image content during a second portion of the first image frame; and performing motion corrected interleaving of the image content at least in part by:

determine a velocity associated with the image content based on the first position and the second position;

determine, based on the velocity and the first position, an intermediate position for the image content in the second portion of the first image frame; and operate the second grouping of the plurality of rows to display the image content at the intermediate position.

18. The non-transitory, computer-readable medium of claim 17, wherein a third grouping of the plurality of rows displays image content during a third portion of the first image frame.

19. The non-transitory, computer-readable medium of claim 18, wherein a fourth grouping of the plurality of rows displays image content during a fourth portion of the first image frame.

20. The non-transitory, computer-readable medium of claim 17, wherein at least a portion of the first portion of the first image frame overlaps with the second portion of the first image frame.

* * * * *